United States Patent [19]

El-Hag et al.

[11] Patent Number: 4,551,340

[45] Date of Patent: Nov. 5, 1985

[54] PROCESS FOR PREPARING FROZEN PAR-FRIED POTATOES

[75] Inventors: Nabil A. El-Hag, Lake Peekskill, N.Y.; Stuart A. Cochran, Robinsville, N.J.; Kenneth R. Schwabe, Tuckahoe; Louis Carricato, Yonkers, both of N.Y.; Sudhakar P. Shanbhag, Bourbonnais, Ill.

[73] Assignee: General Foods Corporation, White Plains, N.Y.

[21] Appl. No.: 212,178

[22] Filed: Dec. 2, 1980

[51] Int. Cl.$^4$ .............................................. A23L 1/216
[52] U.S. Cl. ................................................... 426/437
[58] Field of Search ............... 426/102, 438, 441, 637, 426/307, 302, 524

[56] References Cited

U.S. PATENT DOCUMENTS

| 3,175,914 | 3/1965 | Vahlsing, Jr. | 426/302 |
|---|---|---|---|
| 3,484,252 | 12/1969 | Popeil | 426/438 |
| 3,597,227 | 8/1971 | Murray et al. | 426/102 |

*Primary Examiner*—Arthur L. Corbin
*Attorney, Agent, or Firm*—T. R. Savoie; T. A. Marcoux; D. J. Donovan

[57] ABSTRACT

A process for simulating the taste and texture of deep fat fried potatoes has been developed. The process consists of having the potatoes washed, peeled, trimmed, sorted, cut, blanched, or otherwise processed in conventional manner, and thereafter starch coated, oil soaked, par-fried and frozen. This process produces an improved potato product that more closely approximates deep fat fried foods. Most preferably the potato comestible will be reheated on a heat transferring apparatus.

7 Claims, 5 Drawing Figures

Typical Force/Deformation Curve
by Single Blade Cutting Methodology

Force/Deformation Curve of Shoestring Potatoes of Reconstituted Example V

Force/Deformation Curve of Fried Potatoes from Commercial Fast Food Restaurant

Force/Deformation Curve of Orelda Shoestring Potatoes Cooked According to Recipe Force/Deformation Curve of Oreida Shoestring Potatoes Oven Cooked for 20' at 450°F

SHOESTRING FRENCH FRIED POTATOES
EFFECTS OF POTATO PROCESSING STAGES
OIL SOAK

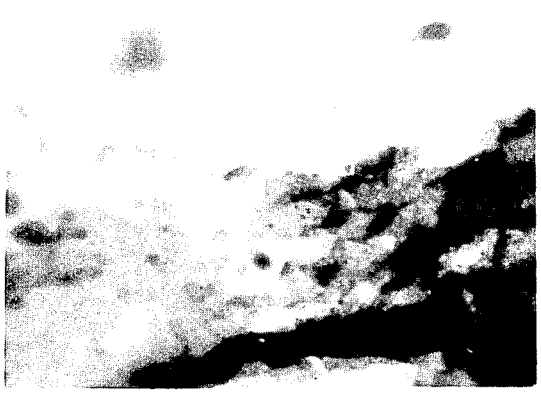

PICTURE 1

Elimination of Oil Soak (34X)

1. Inner layer is composed of deformed and damaged cells. Starch debris from cells were found in the staining medium.

PICTURE 2

180°F Oil Soak, Cool   - 3 seconds (34X)

1. Outer layer composed of compacted deformed cells.

2. Inner layers composed of fluffy, intact, cells separated from each other.

3. Some separation between outer and inner layers.

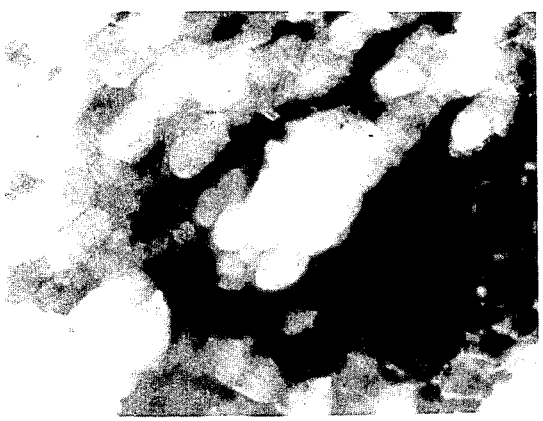

PICTURE 3

180°F Oil Soak, Cool 10°F - 5 minutes (34X)

1. Inner layer composed of white fluffy, intact cells separated from each other

REGULAR CUT FRENCH FRIED POTATOES
EFFECTS OF POTATO PROCESSING STAGES
COOLING
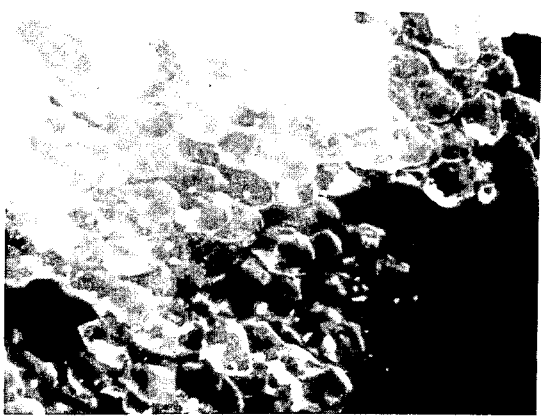
PICTURE 4
Cooling Time: 3 seconds  (34X)
1. Inner layers composed of fluffy, intact, cells not often separated from each other.
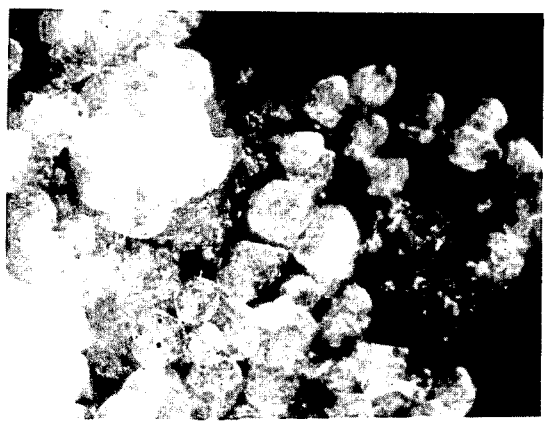
PICTURE 5
Cooling Time: 5 minutes  (34X)
1. Inner layers composed of fluffy, intact, cells more separated from each other.
2. Inner layered cells appear larger in more cooled samples.

SHOESTRING FRENCH FRIED POTATOES (LIGHT MICROSCOPY)

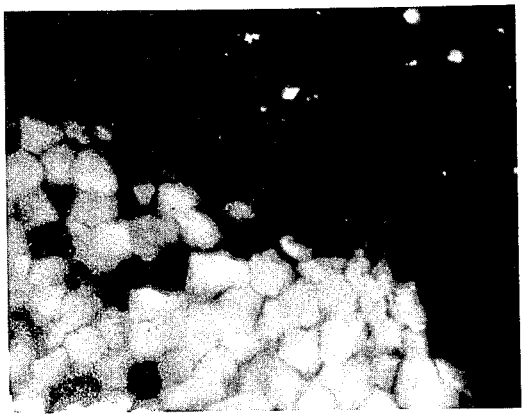

PICTURE 6

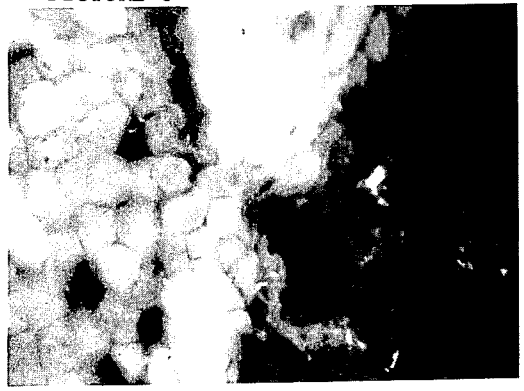

PICTURE 7

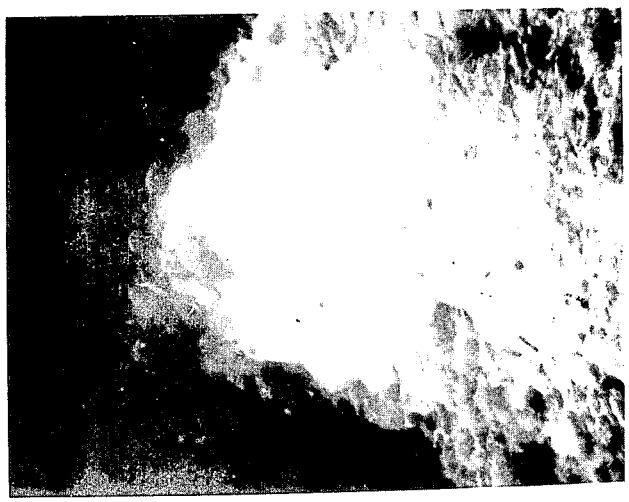

PICTURE 8

Crispy Cookin' -    (34X)

1. Glassy outer layer composed of compacted deformed cells.

2. Inner layers composed of fluffy, white, intact cells separated from each other.

3. Visible separation between glassy outer layer and inner layers.

Ore-Ida (27X)

1. No distinct outer or inner layers.

2. Most cells are deformed

3. Cells are not separated from each other.

SHOESTRING FRENCH FRIED POTATOES (LIGHT MICROSCOPY)
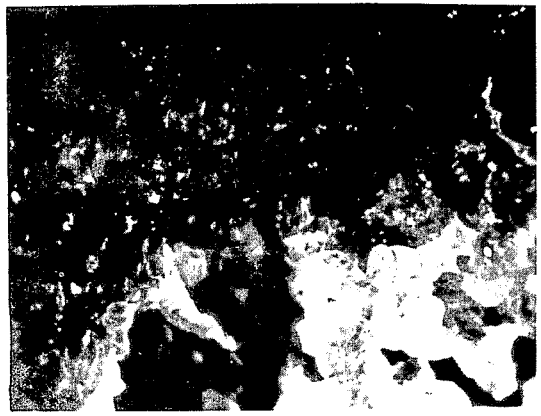
PICTURE 9
Crispy Cookin' - (34X)
1. Glassy outer layer composed of compacted deformed cells.
2. Inner layer composed of fluffy, intact cells slightly separated from each other.
3. Some separation between glassy outer layer and inner layers.
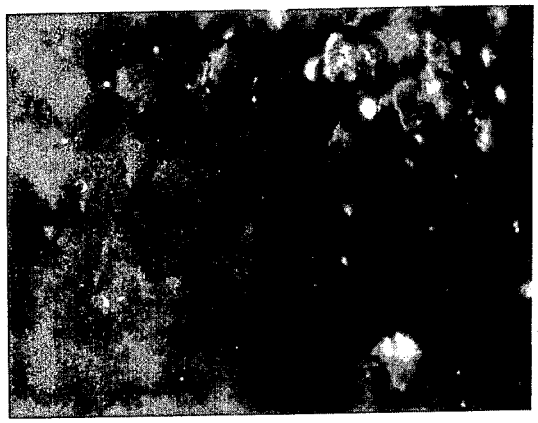
PICTURE 10

PROCESS FOR PREPARING FROZEN PAR-FRIED POTATOES

DESCRIPTION

Technical Field

The invention is in the general field of potato food products and of methods and apparatus for producing them and is particularly concerned with frozen French fries and the like, e.g., "shoe string" potatoes, as customarily packaged and sold in partially prepared condition to housewives, restaurants, and other consumers for rapid processing to the final product.

French fries are presently packaged and sold in frozen, partially prepared condition for reheating in the oven immediately prior to being served. Partially prepared French fries are potatoes that have been washed, peeled, trimmed, sorted, cut, blanched and partially deep fat fried. A busy housewife usually is not equipped for deep fat frying, especially one who buys the frozen product for convenience. In most instances, the product as purchased is placed in an oven in the frozen state and is heated to a temperature adequate for browning and warming. However, the oven-reheated product is by no means the equivalent of a potato that has been completely deep fat fried. This is so because the desirable dehydration of surface areas of the potatoes that took place during the initial frying in deep fat is counteracted during oven reheating by moisture migrating from the center, without the compensating crisping effect of deep fat drying. This tends to make the oven-reheated product limp and soggy. Moreover, such oven-reheated, partially prepared French fries do not acquire the golden brown color of those completely deep fat fried. Thus, oven-reheated frozen french fries of the type commercially available do not have the color, flavor, nor crispness customarily expected of French fries which have been completely deep fat fried, and are generally a disappointment to the purchaser.

The two most serious problems encountered in the commercial manufacture of frozen partially prepared French fried potatoes are non-uniform color formation and poor textural qualities affecting the palatableness of the oven-reheated product. Ideally, upon oven reheating of partially prepared French fries, the potatoes should be golden brown in color for maximum consumer attractiveness. Also, the finished oven-reheated product should have a crisp but not hard outer crust surrounding a mealy, white interior having the consistency of a baked potato.

Obtaining these ideal characteristics from a frozen partially prepared French fried potatoes are difficult to obtain on a commercial scale for several reasons. First of all, environmental factors such as the source of the potatoes, their maturity when harvested, the conditions under which they have been stored, and the like all give rise to large variations in the composition of the raw potato which in turn make it difficult to achieve uniformity in the final product.

Color formation in the finished fried potato is now known to be caused basically by the interaction of reducing sugars and amino acids, with ascorbic acid, proteins and other materials also playing a minor role in the color forming process. The environmental factors mentioned above definitely cause changes in the quantity of the color forming bodies contained in the raw potato. For example, storage at low temperatures causes an increase in the reducing sugar content of the potatoes with a corresponding decrease in the starch content. On the other hand, at high storage temperatures, the process is reversed, with increase in the starch content and decrease in the reducing sugar content. These variations are difficult to adjust for in a commercial process and make the problem of nonuniform color formation a serious one in the industry.

As for palatableness of the product, it is a fact that after oven reheating, partially prepared frozen French fried potatoes are often excessively oily and limp with concave sagging surfaces and collapsed interiors. These textural deficiencies definitely make the product less acceptable and detract from its palatableness.

There have been proposed several methods in the prior art to overcome some of these problems. One of the most widely known of these is the step of dipping the cut potatoes in an aqueous solution of absorbable reducing sugars prior to frying in order to level out the variations in reducing sugar content of the raw potatoes. The idea here is that if a uniform sugar content can be established in the raw potato, then the color developed from frying should also be uniform.

Another method to overcome some of these problems is to coat the gelatinized surface of the potato product obtained after blanching with an aqueous suspension of gelatinized starch. This step has been described in Vahlsing, U.S. Pat. No. 3,175,914 and Murray, U.S. Pat. No. 3,597,227, as well Gold, U.S. Pat. No. 3,424,591, which are herein incorporated by reference. Still others have concentrated on preparing an edible potato dough suitable for preparing French fry potatoes which closely resemble French fry potatoes prepared directly from fresh, raw potatoes. As described by Bates et al, U.S. Pat. No. 4,109,012, when manufacturing French fry potatoes from potato dough, it is desireable to limit the amount of free starch and the use of non-potato ingredients for binder. Bates et al further teach that to obtain a crisp outer surface with formed French fries, it is necessary to condition the surface of the cut potato dough strips to promote the formation of crisp outer surface, or "crust". Bates et al condition the cut dough strips with either an air heat or oil heat treatment step.

Other types of oil treatments include McLaughlin et al, U.S. Pat. No. 3,355,299, which teaches oil blanching at temperatures from 270° F. to 325° F. (approximately 132° C. to 163° C.) for 50 seconds to 90 seconds. Reconstitution of McLaughlin et al's product is accomplished in a three step process comprising preliminary frying, air cooling and final refrying. Another reference to cooling between par-frying is found in the cookbook, *Joy of Cooking*, Irma S. Rombauer, Bobbs-Merrill, 1975.

Other prior art references have tried to pretreat the potato product prior to par-frying by a variety of pre-treatment steps. Such pre-treatment steps are described in Huxsoll et al, U.S. Pat. No. 3,594,188; Weaver et al, U.S. Pat. No. 3,934,046; Gorfien et al U.S. Pat. No. 4,109,020; Libby, U.S. Pat. No. 3,078,172; Schoch et al, U.S. Pat. No. 3,669,686; Traisman, U.S. Pat. No. 3,050,404. However, these and other proposed suggestions neither fulfilled initial expectations nor have been widely accepted in the industry as a satisfactory solution to the problems.

In the making of the present invention, it was a principal object to provide a process for producing frozen, partially prepared French fries capable of reconstitution in the oven to a condition more nearly equivalent to freshly deep fat fried French fries then had heretofore been possible.

DISCLOSURE OF THE INVENTION

Figure 1:
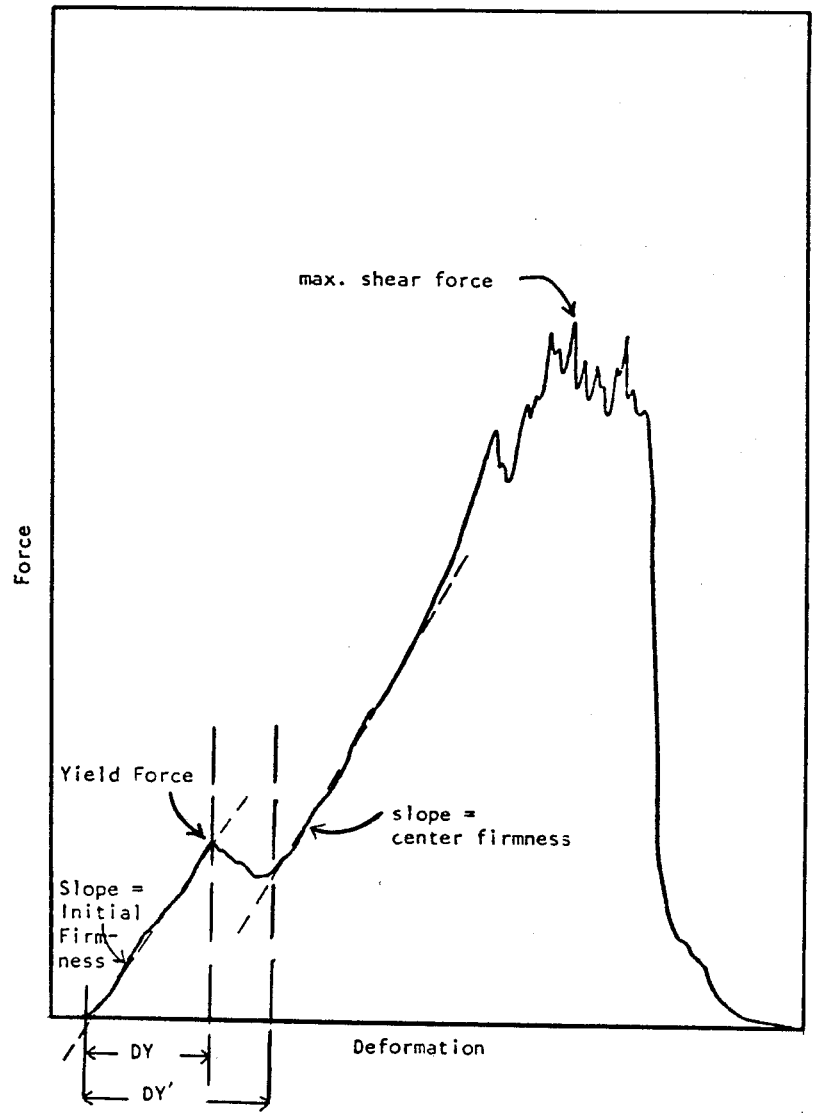
FIG. 1 represents a typical force/deformation curve associated with the single blade cutting test.

The general purpose of this invention is to provide partially prepared potato comestibles that approximate the attributes and characteristics of deep fat fried potato products upon reheating. The present invention consists of a novel process for producing a frozen partially prepared potato product. Potato products are defined to mean porducts consisting of whole potato pieces. The pieces may be cubes, slices, ribbons and especially ¼" and 5/16" potato strips but excludes any piece that may be formed from potato dough. This process produces products that are particularly suited for a unique technique for cooking the frozen comestible to reproduce, color, taste, moisture and texture profiles of freshly deep fat fried potatoes. In the case of hash brown potatoes that are normally fried on a gridle, deep fat fried, or prepared in a baking pan in an oven, the process of this invention enables one to obtain comestibles through oven preparation that are comparable or better than obtained through conventional frying preparation methods. To obtain the desired uniform product upon heating, the potato product should be par fried providing a slight brown color. The light brown color developed is more appealing to the consumer than the near white colored potatoes that do not appear to approximate the final finished product. It has been found that there is definite correlation between the water and total solids and the texture of deep fat fried potatoes. The crust thickness of the oven-reheated potato product should closely approximate the crust thickness of deep fat fried potatoes. To achieve this, the partially prepared potato product should have a negligible crust thickness after parfrying; i.e., before reheating it to be served for consumption. These textural and color attributes have not been duplicated by prior art frozen partially prepared potato products which are suitable for oven reheating.

The method for improving the taste, texture, moisture and appearance of frozen potato products wherein the potato products consist of whole potato pieces that are to be heated in an oven before consumption comprises soaking potato products in an oil bath having a temperature from 120° F. to 250° F. for 30 seconds to 6 minutes, par-frying said potato products in oil having a temperature from 325° F. to 400° F. for 15 seconds to 270 seconds and freezing the par-fried potato for commercial distribution. The product resulting from this process has a composition having at least 34% potato solids by weight and at least 9% fat by weight. More preferably, the potato product has at least 36% potato solids by weight and at least 10% fat by weight. Most preferably fat will be at least 12% fat by weight.

Preferably, the partially prepared potato comestible is heated on a heat transferring apparatus or device. A heat transferring apparatus or device is defined as a means of supporting discrete pieces of food in an oven, whereby the effect of conduction heating is minimized and the effect of convection heating is maximized. In order to maximize such type of heating, the amount of structure supporting the comestible in the oven should be minimized. Wire screens or other supporting surfaces which contain a plurality of aperatures may be considered as heat transferring apparatuses which minimize conduction heating and maximize convective heating. However, mere wire screens are not practical because oil drippage creates a dirty heating environment which is susceptible to causing oven fires. Therefore, the heat transferrin apparatuses should also contain sufficient structure to effect the collection of oil which exudes from the parfried comestible during oven heating. Further disclosure as to the use and description of a heat transferring apparatus may be found in commonly-assigned U.S. patent applications Ser. No. 195,286, filed Oct. 7, 1980; Ser. No. 055,876, filed July 6, 1979; Ser. No. 064,307, filed Aug. 6, 1979 which are herein incorporated by reference.

It is a feature of this invention to develop an oven reheatable potato product that is significantly preferred to the prior art on the basis of taste/eating satisfaction and are at parity with deep fat fried products. Another object of the invention is the provision of convenient preparation and cleanup, whereby the time and effort involved is lessened.

An additional feature is to provide a product having a storage life of at least six months in normal frozen distribution conditions, and thereby maintaining acceptable quality. It is still another object to provide products capable of being placed directly into an oven from the freezer and heated within ten minutes and which generate a deep fat fried flavor and aroma.

Other objects, features and advantages of this invention will be apparent from the following detailed description and appended claims.

BEST MODE FOR CARRYING OUT THE INVENTION

The quality of French fries will vary with the potato used. This variance will occur both between different species of potatoes and the age of the potato within a given species. The variance is due to different chemical and physical characteristics inherent in the potatoes, such as sugar content, starch content, and specific gravity. The problems caused by variations of such properties in potatoes are discussed in detail in Potato Processing, published in 1975 by the A.V.I. Publishing Co., Inc., Westport, Conn., and edited by W. F. Talbert and O. Smith. Despite these variations, the present invention enables the production of superior quality French fry potatoes in a conventional home oven as compared to the same raw potatoes prepared by conventional potato processing which are subsequently reheated on a baking pan or ridged bottom tray in a conventional home oven.

In accordance with the present invention, raw unpeeled white potatoes are obtained for processing. Any variety of potatoes is acceptable, for instance Garnet Chili, Early Rose, Russet Rural, Peach Blow, Early Ohio, Triumph, Kennebec, Merrimack, Delus, Saco, Katahdin, Bounty, Cherokee, Chippewa, Early Gem, Haig, Irish Cobbler, La Rouge, Norgold Russet, Norland, Onaway, Pungo, Red La Sorda, Red McGlure, Red Pontiac, Russet Burbank, Russet Sebago, Sebago Superior, Viking or White Rose. However, it is preferred to use Russet Burbank or Katahdin potatoes in the practice of this invention to obtain the best combination of internal texture and flavor in the final French fry potato product.

The potatoes are washed, peeled, trimmed, sorted, and cut. Each of these steps are well known in the art and discussed in detailed in the Potato Processing reference described above.

The cut potato strips are further processed by any conventional method known in the art. An excellent source of potato processing information may be found in Talburt and Smith, *Potato Processing*, supra, herein incorporated by reference, and U.S. Pat. No. 3,397,993 to Strong and U.S. Pat. No. 3,649,305 to Wilder. Four sample methods are disclosed as follows. In the first method, the cut potato strips are blanched in approximately 74° C. to 93° C. (approximately 165° F. to 200° F.) water for 6-20 minutes, cooled to less than 38° C. (approximately 100° F.), then blanched again with approximately 74° C. to 93° C. (approximately 165° to 200° F.) water for 3 to 4 minutes, and treated with a dextrose dip at approximately 71° C. (approximately 160° F.) for 30 seconds. In the second method, and cut potato strips are pre-treated with water at approximately 71° C. (approximately 160° F.) for 3 to 8 minutes, treated with sodium acid pyrophosphate and sulfur dioxide, dried with approximately 93° C. to 121° C. (approximately 200° F. to 250° F.) air for 12 minutes, and steam blanched at atmospheric pressure for 5 to 7 minutes. The third method, the cut potato strips are simply blanched for a longer period of time as known in the art. A fourth method is prepared by treating the potatoes with sulfur dioxide to inhibit browning of the potato slices, water blanching the treated potatoes for approximately 5 minutes with water at approximately 82° C. (approximately 180° F.). Thereafter, the sliced, treated, blanched potatoes are dried with air at a temperature of approximately 121° C. (approximately 250° F.) for about 3 minutes. During this step, the potato strips weight loss is approximately 25%. This product is par-fried for approximately 45 seconds in oil at approximately 177° C. (approximately 350° F.). The potato strips are then frozen.

Generally, the cut potato strips are water-blanched prior to frying. Advantages of blanching include more uniform color of fried products, reduction of fat absorption through gelatinization of the surface starch, reduced frying time since the potato is partially cooked by blanching, and improved texture of the final product. Blanching has a leaching effect on the sugars and serves to even out variations of sugar concentration at or near the surfaces of the cut potato strips. This gives a lighter and more uniform color on frying. One skilled in the art understands that is common practice to operate two blanchers in series for greater flexibility and more effective control of product color.

Generally, the pre-treatment step of method two minimizes the leaching of natural sugar from the cut potato strips. The sodium acid pyrophosphate treatment heightens the color development.

Once the cut potato slices have completed these steps, the surface layer may be wetted with an aqueous suspension of a film-forming hydrocolloid, glucose polymer, most preferably potato starch which is not pregelatinized. However, one skilled in the art will appreciate that gelatinized starch may also be used, but at lower concentrations. The starch bath provides a very accessible layer of starch on each potato piece. Without the starch treatment, the cut potato slices have only the natural starch which is embedded in the potato cell matrix. It has been found that the starch treatment is preferred when the potato strips are frozen prior to receiving an oil soaking as described in method four and Examples I and II, infra. It is postulated that when potato strips are frozen according to method four, the Strong patented process, Wilder patented process or other known or patented methods that the starch layer on the potato strip is not accessible for physical and chemical modifications which occur in subsequent processing steps. It is therefore thought necessary that the overt layer of starch be applied to the frozen potato strips. If the potato strips are not frozen, it appears that the natural starch embedded and adhereing to the potato strip surface is sufficiently free to provide the requisite starch layer; however the addition of starch can further enhance product quality.

The potato starch solution, when employed, should be of a concentration from 1% to 10%, most preferably at a concentration of 5% which is maintained from approximately 16° C. to 27° C. (approximately 60° F. to 80° F.). The potatoes should be dipped for 5 to 90 seconds, most preferably for 20 to 40 seconds. The concentration and temperature of the starch solution as well as the dipping time is controlled to coat the cut potato strips. The starch solution will contain more amylopectin than amylose. The amylopectin being a highly-branched chain glucose polymer provides the desired film forming.

Since the hydrocolloid film functions not only to minimize oil adsorption, but also to control moisture loss during frying and oven reheating, the amount of hydrocolloid on the potato surface, i.e., the film thickness, is important. A too thin film provides inadequate oil resistance and permits a high moisture and yield loss. Yet a heavy coating impairs the development of a uniform color and often leads to the rupture of the film from excessive internal pressure during frying or oven reheating. A heavy coating of starch also permits entrapment of oil and causes an undesirable mottled or speckled surface color. Proper control of the film thickness can be achieved by adjustment of the viscosity and temperature of the aqueous treating solution and the contact time.

The cut potato slices are next oil soaked. Oil soaking is for 30 seconds to 6 minutes at a temperature of approximately 49° C. to 121° C. (approximately 120° F. to 250° F.). More preferably, the oil soak is for 40 seconds to 3 minutes at a temperature from approximately 64° C. to 116° C. (approximately 142° F. to 240° F.). It appears that when the potato strip is frozen, it may require oil soaking at temperatures of 120° F. to 210° F. (approximately 49° C. to 99° C.) and at times of two to six minutes to substantially gelatinize the potato surface. More preferably, when the potato strip is frozen, the oil soak time is from 3 to 5 minutes at a temperature from 160° F. to 190° F. During oil soaking, the starch layer appears to substantially gelatinizes and the liberated amylose and amylopectin appear to form a relatively homogeneous layer of a polysaccharide-oil complex on the surface.

According to Talburt, when the temperature of a potato is raised to above 120° F. (approximately 49° C.), water passes from the non-starchy parts of the cell into the starch granule, which then starts to swell. The starch will begin to gelatinize in the range of 147° to 160° F. (approximately 64° C. to 71° C.). In potatoes of high starch content, the cells tend to separate and round off largely because of the swelling of the gelatinized starch. In potatoes of low starch content, the cells tend to retain their original orientation with respect to each other. This results in sogginess. It is the amount of starch in the individual cell rather than the total amount of starch in the potato that is related to the mechanism of cell separation. Excessive cell separation results in "sloughing". This sloughing tendency not only is important in the cooking of the potato, but also in external sloughing encountered with commercial methods of peeling by heat and lye scald.

Next, the comestible is par-fried. The par-frying step produced what is known as a "par-fried" or "oil-blanched" potato. Par-fries require but a minimum of frying at the processing plant. This accomplishes some browning and crisping as well as heating the potato strip. To have a palatable potato product which has a color similar to deep fat fried potatoes, the color must be partially developed before reheating it for consumption. As color development occurs, crust formation begins to occur. Most importantly, par-frying regulates the total solids and water ratio in the potato comestible. One skilled in the art will appreciate that total solids is the combination of oil and potato solids present in the potato product.

Par-frying is accomplished in a fryer where a somewhat higher and more nearly optimum temperature for par-frying and color development can be maintained. In the transfer from the oil soak to the par-fryer, the strips are desirably agitated which ensures even color development and avoids light areas caused by two or more pieces sticking together throughout the frying process. The temperature of the par-fryer ranges from at least 163° C. to 204° C. (approximately 325° F. to 400° F.), while the par-frying time may range from 15 seconds to 270 seconds. More preferably, the temperature ranges from approximately 163° C. to 191° C. (approximately 325° F. to 375° F.) and the time of par-frying ranges from 30 to 210 seconds. When starting with a frozen par-fried potato that has been oil soaked at a temperature at from 120° F. for two to six minutes, par-frying will be for a time from 10 seconds to 150 seconds at a temperature frm 325° F. to 400° F. More preferably, the par-fry for the frozen, oil soaked potatoes would be for 30 to 90 seconds at 350° F. to 400° F. One skilled in the art will appreciate, however, that temperatures above 390° F. should not be employed because fat breakdown is greatly accelerated by high temperatures. High temperature par-frying is essential to gain desired color, surface texture and to adjust oil and moisture levels. Upon exiting the fryer, the potato product should have a negligible crust thickness.

Preferably, par-frying is accomplished in two fryers wherein the potatoes are cooled before entering the second par-fryer. The blanched pieces entering the fat in the first fryer imposes a heavy load on this fryer for initial heating of the strips and for water evaporation. Consequently, the temperature of the first fryer tends to be lower than that of the second. The temperature of the first par-fryer ranges from at least 149° C. to 191° C. (approximately 300° F. to 375°), while the par-frying time may range from 10 seconds to 120 seconds. More preferably, the temperature ranges from approximately 163° C. to 191° C. (approximately 325° F. to 375° F. ) and the time of par-frying ranges from 40 seconds to 100 seconds.

Subsequent to the first par-fryer, the potatoes are cooled. Cooling is conducted by any suitable method known in the art to reduce the temperature of the potato strip. Cooling is conducted for that period of time sufficient to cool the potato strip below 175° F. (approximately 79° C.). However, cooling potatoes at higher cooling rates seem to improve final product quality. As such, there may be times when it is desired to cool the product simply by subjecting it to room temperature, or ambient air may be used in combination with a cooling tunnel. For matters of convenience and economy, it is preferred that the air temperature be below 100° F. (approximately 38° C.). This lower temperature would also tend to cool rather than cook the potato strip further.

The oil soaked par-fried cooled potato strip is then par-fried once again in the second fryer where a somewhat higher and more nearly optimum temperature for color development can be maintained. The temperature of the second par-fryer ranges from approximately 163° C. to 204° C. (approximately 325° F. to 400° F.) while the par-frying time may range from 10 seconds to 180 seconds. More preferably, the temperature ranges from approximately 177° C. to 191° C. (approximately 350° F. to 375° F.) and the time of par-frying ranges from 60 seconds to 150 seconds.

After par-frying, the product is quick frozen in a conventional manner at temperatures below the freezing point of water, and preferably below −17° C. (approximately 0° F.).

Frozen potato products made according to Example I, having high total solids content, were viewed by a scanning electron microscope. The resulting images showed a distinct acellular structure of a polysaccharide-oil complex on the surface of the potato product.

The following hypothesis is used to explain this phenomena of the invention. However, the hypothesis of the existence and mechanism by which the invention may operate is not designed to limit the scope of the present invention, but is advanced only as a means of explaining the effects produced.

Verification of the polysaccharide-oil complex hypothesis was attempted by processing frozen potatoes with the starch bath and no oil soak, and with the oil soak and no starch bath. Scanning electron microscopic photographs of the surface and cross-section of each were compared to the starch coated, oil soaked, par-fried process. Taking the samples directly from the starch bath to the par-fry (no oil soaked) gave much less indication of a layer of starch polymers. This may be shown by photomicrographs. Apparently the high temperature par-frying gelatinized the starch but also dehydrated the surface before the granular nature was lost. The product from the oil soak but no added starch was not granular and was acellular in character but was not as acellular as the starch coated, oil soaked, par-fried preferred product of the invention. By manipulating the oil soak time, one may employ a frozen potato strip without an overtly added starch coating and still obtain a potato comestible which has a structural appearance that is both accellular and not granular, very much like the starch coated, oil soaked potato comestible. The oil soak was most effective when there is a layer of overtly added starch readily available for gelatinization. The oil soak had the desirable effect of further cooking the surface starch producing an essentially completely disrupted cellular structure (acellular appearance with little granular character) although cell walls are present precluding a homogeneous appearance as viewed by photomicrograph. In addition to the oil soaking causing more complete surface starch gelatinization, the overt potato starch addition produces an improved color, crispness and fried potato flavor.

Further microscopic analysis done by light microscopy have shown the relative importance of oil soaking and cooling. Pictures 1 through 10 are the light microscopy pictures taken of products that had been frozen and not reconstituted for consumption. In the picture labeled Picture 1, Elimination of Oil Soak (34×), omission of the oil soak from the process described in Example V shows considerable damage to the internal potato cells. The inner layer is composed of deformed and damaged cells. Starch debris from cells were found in the staining medium, which further indicates cellular disruption. It is speculated that the oil soak probably prevents the product from undergoing a type of thermal shock damage when introduced into the par-fryer. In picture number 2, labeled 180° F. Oil Soak, Cool—3 seconds, the process described in Example V is modified such that the oil-soak was at 180° F. instead of 250° F. and the cooling between par-fries was shortened from 60 seconds to 3 seconds. Air at ambient temperature was employed. Likewise, picture 3, labeled 180° F. Oil Soak Cool 10° F.—5 minutes (34×), is the process in Example V except the oil-soak was reduced to 180° F. and the cooling is lengthened from 60 seconds to 5 minutes. Ambient air was used in combination with a 5 minute, 10° F. static freezer cooling. The outer layer of potato cells appears to be composed of compacted deformed cells. The inner layers appear to be composed of fluffy, intact, cells separated from each other. Some separation occurs between the outer and inner layers. Increasing the cooling time corresponds with more cell separation. The inner layer appears composed of white fluffy, intact cells separated from each other. Cell separation is probably related to a desireable internal mealiness and firmness. By comparing pictures 4 and 5, labeled Cooling Time: 3 seconds (34×) and Cooling Time: 5 minutes (34×), respectively, further differences may be noted which are believed to contribute to the bi-textural nature of the product of this invention. In picture 4, the process employed is described in Example V except that the cooling time was shortened from 60 seconds to 3 seconds. In picture 4, the inner layers are composed of fluffy, intact, cells which are not often separated from each other. In comparison, picture 5, which is the process described in Example V except the cooling time was lengthened from 60 seconds to 5 minutes, the inner layers were composed of fluffy, intact, cells which were more separated from each other. Moreover, in picture 5 the inner layered cells appear larger than in picture 4. In Pictures 6 and 7 labeled Crispy Cookin' (34×) the process described in Example I was photographed. One may notice, that the inner layers were composed of fluffy, white, intact cells separated from each other. A glassy outer layer appears composed of compacted deformed cells. In addition, there appears to be a visible separation between the glassy outer layer and inner layers. Picture 8 labeled, Ore-Ida (27×), is a cross sectional picture of a ¼ inch shoestring French fried potato sold by Ore-Ida Food, Inc. No distinct outer or inner layers are apparent. Most cells appear deformed and the cells are not separated from each other. Pictures 9 and 10, labeled Crispy Cookin'—(34×), are from potatoes that are processed according to Example V. Once again a glassy outer layer composed of compacted deformed cells is obtained. The inner layer is composed of fluffy, intact cells slightly separated from each other. Some separation between glassy outer layer and inner layers is obtained. In summary, it appears that oil soaking and cooling both contribute to the product's final bi-textural characteristics.

Bi-textural characteristics were measured by a standarized procedure using a single blade cutting test. Further reference to textural testing may be found in an article by Ross and Porter, *INTERPRETATION OF MULTIPLE-PEAK SHEAR FORCE CURVES OBTAINED WITH FRENCH FRIED POTATOES*, 45 American Potato Journal 462, (1968). Using this testing methodology it was found that the product of this invention, as exemplified by Example V and heated in an oven on a heat transferring apparatus exhibited distinctive bi-textural characteristics as indicated by a difinitive yield force at an early stage of the texture profile. This unique feature was not found in a commercial product prepared according to package instructions, as sold by Ore-Ida Foods, Inc.. Additional work was also performed on shoestring deep fat fried potato strips sold by commerical fast food establishments, which had a yield force comparable to the product of this invention.

Figure 2:
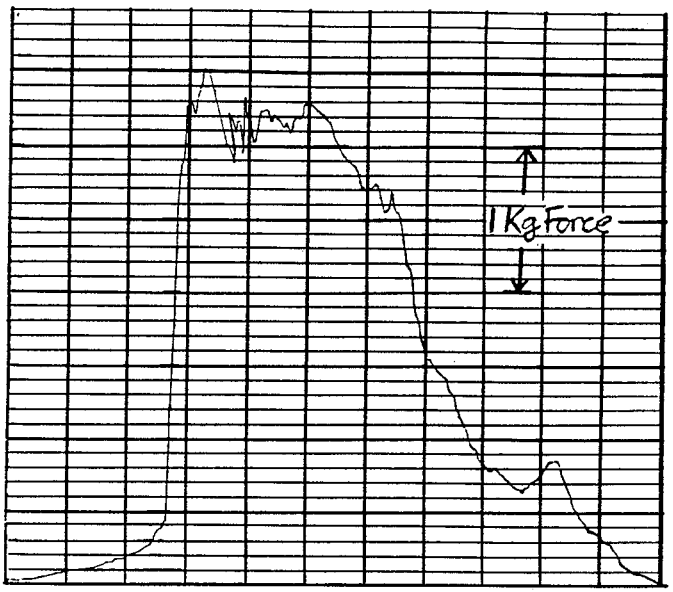
FIG. 2 shows the force/deformation curve of shoestring potatoes of reconstituted Example 5.
Figure 3:
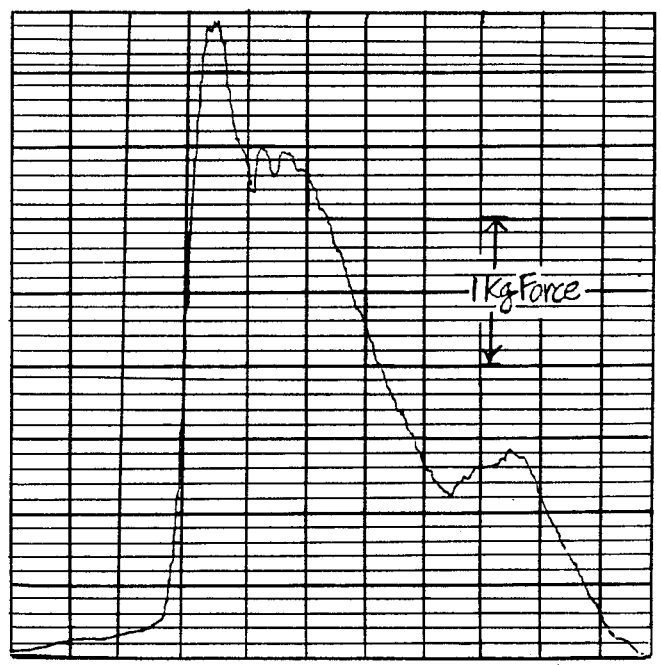
FIG. 3 shows force/deformation curve of fried potatoes sold by commercial fast-food establishments.
Figure 4:
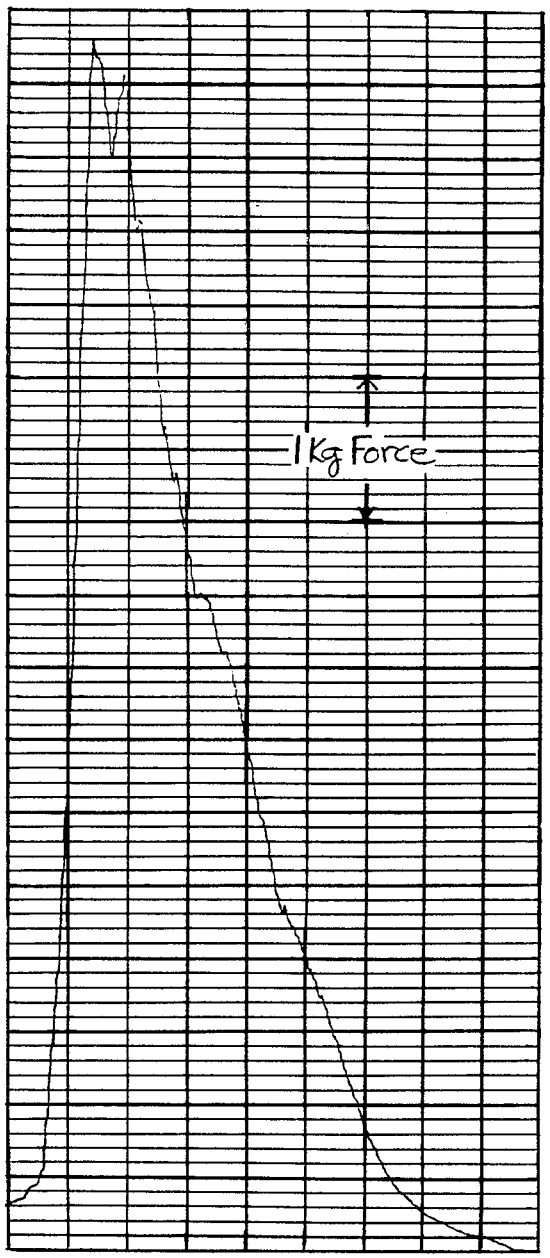
FIG. 4 shows the force/deformation curve of Ore-Ida Foods Inc. shoestring potatoes prepared according to manufacturers oven recipe.

FIG. 1 represents a typical force/deformation curve associated with the single blade cutting test. As determined by FIGS. 2 and 3 the texture of the product of this invention appears to be most similar to products sold by commercial fast food establishments as compared to products sold by Ore-Ida Foods, Inc. and prepared according to package instructions. Both products are bi-textural as indicated in the figures. Specifically, FIGS. 2 and 3 show a distinctive yield (i.e., shoulder with moderate force drop over an extended time period), as well as, a relative low initial firmness and center firmness (i.e., or maximum shear force). In sensory eating quality, the bi-textural nature may be described by a crisp, but not tough, crust with a tender, mealy, but not dry, center.

Figure 5:
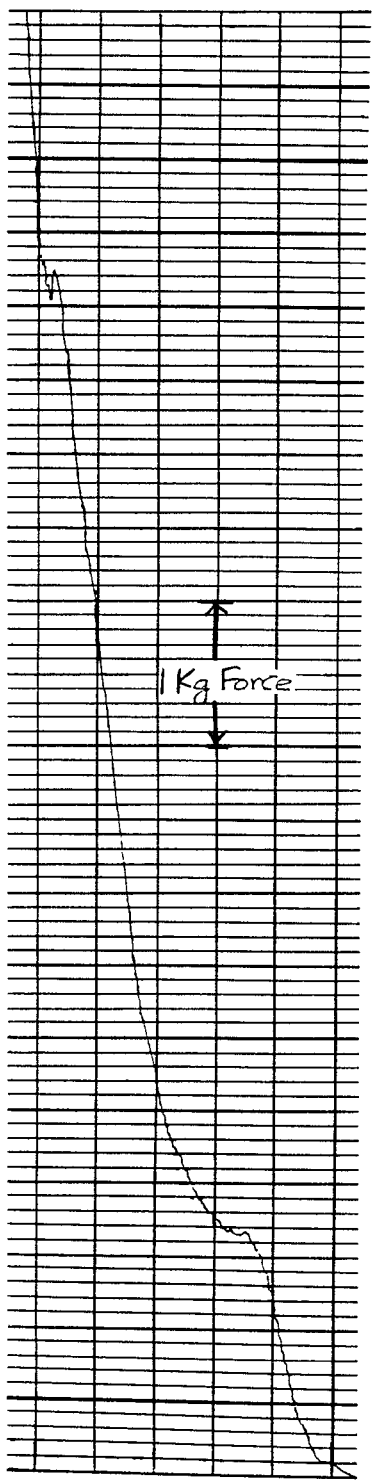
FIG. 5 shows the force/deformation of Ore-Ida Foods Inc.'s shoestring potatoes that have been oven cooked for 20 minutes at 450° F.

Both regular cut and quarter inch shoestring cut potato strips sold by Ore-Ida Foods Inc. prepared according to manufacturers oven recipe (16 minutes, 450° F.) did not show this bi-textural nature. Over cooked Ore-Ida shoestring potatoes (20 minutes, 450° F.) did exhibit a yield force as noted in FIG. 5. However, it was much less pronounced with no significant drop-off. In addition, the initial firmness, center firmness, and maximum shear force were all significantly higher than for the product of this invention as well as quarter inch shoestring potato strips sold by commercial fast food establishments. Sensory evaluation indicated the overcooked Ore-Ida shoestring potatoes were tough, dry and hard (i.e., lack of typical bi-textural nature).

The value added by the oil-soak, par-fry, cool, and par-fry sequence was shown by its substitution for the final par-fry step in the Strong patented French fry potato processes and a conventional French fry potato process known in the art. In both cases, the modified processes yielded higher quality products of greater bitextural nature and better fried potato flavor than the standard processes. Research on alternative sequence of these steps showed one sequence to yield quality product: par-fry, oil soak, par-fry. This sequence provides an oil-soak which probably enhances potato flavor and texture development as a relative cooling step between the two par-fry stages.

EXAMPLE I

In one embodiment of this invention, conventional frozen potato strips, as received by fast food restaurants, are prepared according to this invention. One skilled in the art will understand that conventional frozen potatoes strips as received by fast food restaurants have been parfried before being frozen. One skilled in the art will further appreciate that by starting with a frozen potato comestible, breakage during handling will be minimized and the starch coating application will be generally topical rather than penetrating the comestible. The frozen potato strips are dipped for 30 seconds in a 4% potato starch solution maintained at approximately 21° C. (approximately 70° F.). The starch coated potatoes are then oil soaked for 4 minutes in an oil bath at a temperature of approximately 82° C. (approximately 180° F.). Thereafter the starch coated, oil soaked potatoes are par-fried for 1 minute in oil at approximately 191° C. (approximately 375° F.). The resultant product is then positioned in a blast freezer until they are frozen to a temperature of approximately −17° C. (approximately 0° F.). The potato comestibles are subsequently packaged in combination with the heat transferring apparatus. Upon the heating the potato comestibles on the heat transferrering apparatus, the resultant ratio between total solids and water as well as color, texture, and crust thickness is comparable to potato strips having similar content that have been deep fat fried.

Table I presents the percentages of water, oil and potato solids as well as the weight of the charge at the conclusion of the starch coating, oil soaking and par-frying steps for this embodiment.

TABLE I
COMPOSITIONS

|  | Weight | % H₂O | % Oil | % Potato Solids |
|---|---|---|---|---|
| Fast Food Restaurant's Raw Material as Received | 45 Kg (100 lbs) | 62.7 | 4.6 | 32.7 |
| Potato Strips After Starch Coating | 49 Kg (108 lbs) | 66.9 | 4.3 | 28.8 |
| Potato Strips After Oil Soak | 49 Kg (108 lbs) | 66.8 | 6.9 | 26.3 |
| Potato Strips After Par-frying | 40 Kg (88 lbs) | 47.0 | 15.0 | 38.0 |

EXAMPLES II and III

A comparison was made between potato strips that had been par-fried and frozen and then processed according to this invention (similar to Example I) against raw potato strips that are processed according to this invention and then frozen.

Raw potatoes are peeled and treated with sulfur dioxide. The sulfur dioxide is known to inhibit browning of the raw potato. Next the potato is sliced into approximately 6.4 mm (¼-inch) shoestring potato strips.

The sliced potato strips are then divided into two portions for subsequent processing into Examples II and III. Example II is then prepared by treating a portion by water blanching for 5 minutes. The temperature of the water is approximately 82° C. (approximately 180° F.). Thereafter, the sliced blanched potatoes are dried with air at a temperature of approximately 121° C. (approximately 250° F.) for about 3 minutes. During this step, the potato strips weight loss is approximately 25%. This product is par-fried for 45 seconds in oil at approximately 177° C. (approximately 350° F.). The blanched, par-fried potato strips are then frozen. This product is then coated with an overt layer of ungelatinized starch by dipping it into a 4% starch solution which also contains 1% dextrose for approximately 1 minute.

The use of dextrose coating is known to one skilled in the art for providing a uniform sugar content on the potato comestible surface so that the color development from frying should also be uniform. A variation on this is to dip the cut potatoes in an aqueous solution of absorbable reducing sugars prior to frying in order to level out the variations in reducing sugar content of the raw potatoes.

The starch coated potato strips are then soaked in approximately 82° C. (approximately 180° F.) oil for 4 minutes. The starch coated oil soaked potato strips are thereafter agitated to insure even color development in the par-frying stage. In the par-frying step, the starch coated, oil soaked potato strips are par-fried for 1 minute in vegetable oil at a temperature of approximately 190° C. (approximately 375° F.). After par-frying, the product is quick frozen in conventional manner at tempertures below the freezing point of water, and preferrable below −17° C. (approximately 0° F.).

Example III is prepared by coating the remaining portion of potato strips with an overt layer of ungelatinized starch by dipping them into a 4% starch solution which also contains 1% dextrose for approximately 1 minute. Thereafter, the starch coated potato strips are water blanched for 5 minutes at approximately 82° C. (approximately 180° F.). Next the starch coated, water blanched potato strips are air dried with air at a temperature of approximately 121° C. (approximately 250° F.) for about 3 minutes. During this step, the potato strips weight loss is approximately 25%. This product is soaked in approximately 82° C. (approximately 180° F.) oil for 4 minutes. The starch coated, oil soaked potato strips are thereafter agitated to insure even color development in the par-frying stage. In the par-frying step, the potato strips are par-fried for 1 minute in vegetable oil at a temperature of approximately 190° C. (approximately 375° F.). The product is then quick frozen in a conventional manner.

Products of Examples II and III were compared against each other on the basis of textural and color attributes as well as taste/eating satisfaction. The results proved that the two products were comparable in all respects and are at parity to raw potato strips that are deep fat fried.

Uniformity of color and crust thickness in the potato product is further related to the method in which the partially prepared potato is oven heated for consumption. It has been found that a uniform heat transfer to the partially prepared potato product will produce an end product that more closely approximates the uniformity of color and crust thickness of deep fat fried potatoes. Should one heat the starch coated, oil soaked, par-fried potato product on a baking pan, the resultant ovenreheated potato product will have a more uniform color, crust thickness and a total solids and water ratio approaching deep fat fried potatoes than the known art of oven reheatable potatoes. However, products that are heated on a baking pan lack uniform heat transfer and the conductive heating will cause a non-uniform color and crust thickness where the pan contacts the comestible. Such non-uniform products additionally have distinct textural and flavor differences with portions of the product being limp and undercooked or upon further heating portions being overcooked and charred.

The heat transferring apparatus used in Table II consisted of a U.S. Standard Sieve Series Sieve Number 8 mesh containing stainless steel wire of 0.71 mm (0.028 inch) diameter having an open area of 60%. Such devices and their applications are described in co-pending U.S. patent applications disclosed previously.

Table II is comparison of the composition of one product (Column A) prepared by the starch dip, oil soak, par-fry process (invention) to conventional frozen potatoes as received by fast food restaurants (Column B) and to frozen parfried potatoes sold at retail for oven preparation (Column C).

The product of Column A is produced by taking differs significantly from the finished product $A^1$. The flavor and textural characteristics of the products $C^1$, also are significantly different compared to the product of this inventions, $A^1$, which is significantly preferred by the consumer. The invention product has flavor and texture characteristics in fact that are not appreciably different from the deep fat fried product $B^1$. Appreciable flavor difference between $C^1$ (a) and $C^1$(b) products is caused by using a screen to optimize convection heating as compared to a cookie sheet. The product of this invention has improved texture and flavor compared to retail products oven prepared whether by screen or cookie sheet.

Table II further demonstrates the principle that by starting with a unique starch coated, oil soaked, partially prepared potato product which has a controlled solids to water to oil ratio (as in Column A), one may obtain a potato product, upon heating in a conventional home oven, similar to deep fat fried potatoes.

TABLE II

| | FROZEN PRODUCTS (AS SOLD) | | | | | | | | |
|---|---|---|---|---|---|---|---|---|---|
| PRODUCT | "A" INVENTION FROZEN | | | "B" FAST FOOD FROZEN | | | "C" RETAIL FROZEN | | |
| Composition | Potato Solids | Water | Oil | Potato Solids | Water | Oil | Potato Solids | Water | Oil |
| % | 48 | 36 | 16 | 28 | 63 | 9 | 33 | 57 | 10 |
| Parts | 2.9 | 2.2 | 1 | 3.2 | 7.0 | 1 | 3.2 | 5.6 | 1 |
| Range | 2.6–3.1 | 2.0–2.3 | 1 | 2.8–3.7 | 6.4–7.8 | 1 | 2.5–3.7 | 4.8–6.7 | 1 |
| | FINAL PREPARED PRODUCT (AS EATEN) | | | | | | | | |
| | $A^1$ Oven-Heated | | | $B^1$ Deep Fat Fried | | | $C^1$ Oven-Heated | | |
| Composition | Potato Solids | Water | Oil | Potato Solids | Water | Oil | Potato Solids | Water | Oil |
| % | 50 | 33 | 17 | 47 | 35 | 18 | 52 | 37 | 11 |
| Parts | 2.9 | 1.9 | 1 | 2.6 | 1.9 | 1 | (a) 4.9 (b) 4.7 | 3.5 3.4 | 1 1 |
| Range | 2.7–3.0 | 1.9–2.0 | 1 | 2.5–2.7 | 1.7–2.1 | 1 | — | | |

Product B, (par-fried, fast food frozen shoestring potatoes), and dipping them in an ungelatinized potato starch aqueous mixture to overtly coat the potato with ungelatinized potato solids. These potatoes are then subject to an oil soak of from approximately 49° C. to 99° C. (approximately 120° F. to 210° F.) for a period of time from 2 to 6 minutes. Higher temperatures and/or longer times, within the ranges given, may be required when the potato is frozen. Adjustment within the range of time and temperature is a routine matter so long as the finished product has microscopic surface characteristics which indicate an acellular structure. The soaked unfrozen and partially gelatinized potato is then subjected to a par-frying at a temperature of approximately 163° C. to 218° C. (approximately 325° F. to 425° F.) for from 10–15 seconds. The product, (Product A), is then frozen for distribution and sale.

The frozen product, A, is then reheated in a monolayer preferably in a manner optimizing convection as discussed in U.S. patent application Ser. No. 928,345. When prepared on a screen in an oven its final composition is shown in $A^1$. This product is compared to two controls cooked as follows. Frozen potatoes as received by a fast food chain are deep fat fried to the composition shown in $B^1$. Retail frozen potatoes are heated and cooked to a composition shown in $C^1$ with (a) employing a screen as in preparing $A^1$ and (b) employing the conventional cookie sheet.

It is evident that the cooked retail product composition $C^1$, whether a cookie sheet or screen is employed,

EXAMPLE IV

In another embodiment of this invention, cut potato strips are blanched until all portions receive enough heat to turn them to a generally translucent condition. Care must be exercised in blanching because those portions which are underblanched will turn off color during subsequent processing due to enzymes which are not inactivated and the surfaces of those portions which are overblanched may slough especially with potatoes of high solids content. The hot water blanch is used wherein the cut potato strips are blanched for approximately 10 minutes at a temperature of approximately 82° C. (approximately 180° F.). The cut blanched potato strips are then starch coated by dipping the strips into a 4% potato starch bath for 20 seconds at a temperature of approximately 21° C. (approximately 70° F.). The cut blanched, starch coated potatoes are then oil soaked in approximately 65° C. (approximately 150° F.) oil bath for 3 minutes. The cut blanched, starch coated, oil soaked potatoes are then par-fried in approximately 190° C. to 193° C. (approximately 375° F. to 380° F.) oil for 60 seconds. The resultant product is then positioned in a blast freezer until they are frozen to a temperature of approximately −17° C. (approximately 0° F.). The potato comestibles are subsequently packaged in combination with the heat transferring apparatus. Upon the heating the potato comestibles on the heat transferring apparatus, the resultant ratio between total solids and water as well as color, texture, and crust thickness is comparable to potato strips that have been deep fat fried.

EXAMPLE V

An additional embodiment of this invention starts with raw whole potatoes, washes, peels and slices the whole potatoes into quarter inch potato strips. The potato strips are then heated in water at 155° F. for 8 minutes. Next the potatoes are dipped in a dextrose, sodium bisulphite, sodium acid pyrophosphate solution for 20 seconds. Thereafter, the potatoes are dried a 210° F. to a weight loss of 20%. The dried potatoes are then steam blanched for 5 minutes at 200° F. Upon completion of steam blanching, the potatoes are soaked in oil at 250° F. for 60 seconds. Thereafter, the potatoes are par-fried in oil at 375° F. for 45 seconds. Subsequent to the first par-fry, the potatoes are cooled for 5 minutes to insure the potato temperature is below 175° F. The par-fried cooled potato strips are then par-fried again at 375° F. for 70 seconds. Upon completing the second par-fry, the potatoes are frozen and packaged. Reconstitution is performed with a heat transferring apparatus in an oven at a temperature of 450° F. for 12 minutes.

The compositional makeup of the frozen French-fries were 50% total solids consisting of from 35 to 38% potato solids and from 12–15% oil solids. The frozen French-fries were reconstituted on a convective heating tray. Specifically, frozen French-fried potatoes on a convective heating tray were placed in an oven preheated to 450° F. for 10 to 11½ minutes. The time was varied slightly in order to optimize eating quality.

Frozen Ore-Ida shoestring potatoes were analyzed and were found to contain approximately 36% total solids consisting of approximately 8% oil solids and 28% potato solids. They were reheated in a 450° F. preheated oven for 18 to 20 minutes on a cookie sheet. The cooking time was varied in order to optimize eating quality.

A central location test was conducted at five sites, Cincinnati, Orlando, Massapequa, Oklahoma City and Philadephia among eligible female adults. An eligible female adult for purposes of this test was a woman who was the lady of the house who did not know the interviewer or had not been interviewed within the last three months concerning a food or beverage product, who did not have a close friend or household member employed in food manufacturing, advertising, market research or media news and who within the last two months had used a frozen French-fry product purchased from the store's frozen case. 227 eligible female adults tasted the two products.

The shoestring French-fry product prepared according to this Example achieved a strong preference over the Ore-Ida shoestring product; the margin of preference being nearly three to one. The actual numbers show a 74% preference for the shoestring prepared according to the Example versus a 26% preference for the Ore-Ida shoestring. The minimum theoretical percentage (at a 95% confidence level) which the consumer preference test had to equal to be satistically significant was 56%. The 74% actual percentage preference was 18% higher than the minimum theoretical percentage. The test respondents were also questioned concerning specific attribute preferences and reasons for overall preferences. Of those who preferred the Crispy Cookin' product 56% gave as their main reason for preference the taste and flavor, 36% preferred the crispness and 8% preferred the product because it was softer.

EXAMPLE VI

The procedure of Example V is repeated except this time the whole potatoes are cut into 5/16 inch potato strips. In addition the first par-fry occurs for 60 seconds at 375° F. and the second par-fry occurs for 145 seconds at 375° F. Reconstitution is performed on a heat transferring apparatus in an oven at a temperature of 450° F. for 11 minutes.

A second comparison central location test was conducted at three sites, Cincinatti, Orlando and Metro New York, among 225 eligible female heads of household. This time, the product prepared according to this Example, 5/16 inch regular cut, was tested against Ore-Ida 5/16 inch crinkle cut. The frozen crinkle-cut French-fry accounts for approximately 65% of the total frozen French-fry market. The Ore-Ida crinkle-cut frozen French-fry accounts for approximately 75–80% of the total crinkle-cut market.

The product prepared according to this Example, 5/16 inch regular cut French-fry, was prepared in a similar manner as in Example V previously discussed. The frying times were different because the 5/16" French-fry being larger requires longer periods of par-frying. The first par-fry was for 60 seconds at 375° F. and the second par-fry was for 145 seconds at 375° F. Its compositional makeup was likewise similar. The product of this Example, 5/16 inch flat-cut French-fry, was reconstituted on the convective heating tray while the Ore-Ida crinkle-cut was reheated on a cookie sheet. Cooking times were similar to those previously discussed. Again, cooking times were varied in order to optimize eating quality.

The product prepared according to this Example, 5/16 inch product, was preferred approximately two to one over the Ore-Ida crinkle-cut fry. Specifically, the product prepared according to this Example was preferred by a score of 64% to 36%. The superiority of the product of this Example, according to those participants who preferred the product, lies in the areas of better taste, better color after cooking and crispier texture.

While several embodiments of the present invention have been described in detail, it will be apparent to one of ordinary skill in the art that the teachings of the present invention extend to many other variations and embodiments.

What is claimed:

1. A method of improving the taste, texture, moisture and appearance of frozen potato products wherein the potato products consist of whole raw potato pieces that are to be heated in an oven before consumption which comprises:
   (a) soaking the raw potato pieces in an oil bath having a temperature from 120° F. to 250° F. for 30 seconds to 6 minutes,
   (b) par-frying said potato products by immersing the oil soaked potato pieces in oil having a temperature from 300° F. to 375° F. for 10 seconds to 120 seconds,
   (c) cooling said oil soaked par-fried potato pieces until internal product temperature is below 175° F.,
   (d) par-frying said oil soaked par-fried cooled potato products by immersing the potato piece in oil having a temperature from 325° to 400° F. for 10 seconds to 180 seconds, and then
  (e) freezing the potato pieces for commercial distribution.

2. The method of claim 1 in which the final product is frozen and has a composition having at least 34% potato solids by weight and at least 9% fat by weight.

3. The method of claim 1 wherein the soaking of the raw potato pieces is in an oil bath having a temperature from approximately 142° F. to 240° F. for 40 seconds to 3 minutes.

4. The method of claim 1 wherein the par-frying of step (b) is in oil having a temperature from approximately 325° F. to 375° F. for 40 seconds to 100 seconds.

5. The method of claim 1 wherein cooling of said oil soaked par-fried potato pieces occurs until the internal product temperature is below 100° F.

6. The method of claim 1 wherein the freezing of the potato pieces for commercial distribution is at a temperature below approximately 0° F.

7. A process for preparing frozen French fried potato strips to be reheated in a conventional oven comprising:
  (a) immersing potato strips in oil having a temperature not greater than about 300° F. for 30 seconds to 6 minutes;
  (b) frying said potato strips in oil having a temperature from 300° F.–375° F. for 10 seconds to 120 seconds;
  (c) cooling said fried potato strips;
  (d) frying said cooled potato strips in oil having a temperature from 325° F.–425° F. for 10 seconds to 180 seconds; and then
  (e) freezing said potato strips.

* * * * *